United States Patent
Ramaswamy et al.

(10) Patent No.: US 9,495,663 B2
(45) Date of Patent: Nov. 15, 2016

(54) AUTOMATIC MEETING INVITATION BASED ON PROXIMITY

(75) Inventors: Muralidharan Ramaswamy, Pleasanton, CA (US); Jinseok Nam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 510 days.

(21) Appl. No.: 13/009,446

(22) Filed: Jan. 19, 2011

(65) Prior Publication Data

US 2012/0185291 A1 Jul. 19, 2012

(51) Int. Cl.
*G06Q 10/00* (2012.01)
*G06Q 10/10* (2012.01)

(52) U.S. Cl.
CPC .................. *G06Q 10/1095* (2013.01)

(58) Field of Classification Search
CPC .......... G06Q 10/00; G06Q 40/00; G06F 17/60
USPC ....................................................... 705/7.19
See application file for complete search history.

(56) References Cited

U.S. PATENT DOCUMENTS

| | | | |
|---|---|---|---|
| 6,363,352 B1* | 3/2002 | Dailey et al. ................. 705/7.19 |
| 7,113,797 B2* | 9/2006 | Kelley .................. G06Q 10/109 |
| | | | 455/456.1 |
| 8,121,953 B1* | 2/2012 | Orttung et al. ................. 705/52 |
| 2005/0202834 A1* | 9/2005 | Sudit .......................... 455/456.5 |
| 2009/0214010 A1* | 8/2009 | Langgood et al. ...... 379/110.01 |
| 2009/0327227 A1* | 12/2009 | Chakra .................. G06Q 10/10 |
| 2011/0279631 A1* | 11/2011 | Ranganath ............ H04M 3/565 |
| | | | 348/14.08 |

OTHER PUBLICATIONS

Cisco Systems, Inc., WebEx Key Features—Invite and remind, Invite people from the scheduler, http://www.webex.com/Ip/keyfeatures/invite.php, 1997-2010.

* cited by examiner

*Primary Examiner* — Roman Jeanty (57) ABSTRACT

In one implementation, proximity of a possible meeting participant is used to initiate joining the meeting. A host device or other device detects the presence of a possible meeting participant in a room, conference center, or other region. In response, an invite is sent for joining the meeting. The proximity based invitation may remove the requirement of the possible participant from having to find a previous message with the meeting invitation for joining and/or the requirement of the host to manually invite the possible participant. From the perspective of the possible participant, merely being in the proximity of the meeting may be enough to initiate joining, to receive an invite, and/or to join a meeting.

21 Claims, 4 Drawing Sheets

AUTOMATIC MEETING INVITATION BASED ON PROXIMITY

FIELD

The present embodiments relate to network conferencing.

BACKGROUND

Network conferencing, such as provided in Webex by Cisco®, interconnects various users over a computer network for video, audio, and/or data communications. A host organizing a meeting may define two levels of attendees: required and optional. When a meeting is created, authorized attendees receive an invitation in an email or other message. The invitation has a url or clickable link for joining the meeting. However, some users may later misplace or otherwise be unable to access the invitation at the time of the meeting. Other users may decide not to attend the meeting, so delete the invitation. Regardless of the reason why, a user may decide to participate in a meeting but have limited or no access to the invitation.

Where a new participant wants to join a meeting at the last moment, the host may instant message or email an invitation or the url link to the participant join the meeting. However, the email or instant message is done manually by the meeting host, so may disrupt the meeting or preparation for the meeting.

DETAILED DESCRIPTION

Overview

Proximity of a possible meeting participant is used to initiate joining the meeting. A host device or other device detects the presence of a possible meeting participant in a room, conference center, or other region. In response, an invite is sent for joining the meeting. The proximity based invitation may allow the possible participant to avoid finding a previous message with the meeting invitation and/or allow the host to avoid manually inviting the possible participant. From the perspective of the possible participant, merely being in the proximity of the meeting may be enough to initiate joining, to receive an invite, and/or to join a meeting.

In a first aspect, a method is provided. A meeting between participants is hosted in a computer network. Proximity of a communications device of a possible participant for the meeting to a host device is determined. The possible participant is invited to join the meeting based on the proximity.

In a second aspect, a meeting system is provided. A processor for detecting a user's device within a distance of a location of a meeting is provided. The meeting is for communications over a network between a plurality of participants. A transmitter connects with the processor. The transmitter is for sending invite information for the meeting to the user's device.

In a third aspect, one or more computer readable storage media are encoded with software comprising computer executable instructions. When the software is executed, the software is operable to receive invite information for a meeting based on proximity of a device to the meeting, and present to a user of the device an opportunity to join the meeting, the opportunity being based on the invite information.

Example Embodiments

Figure 1:
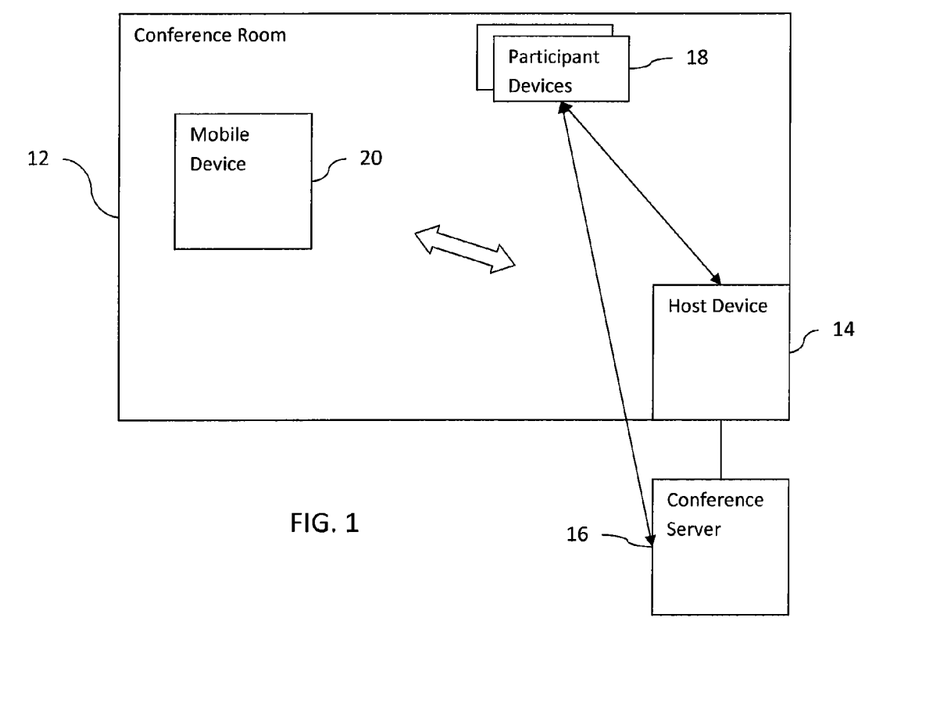
FIG. 1 illustrates an example meeting network with proximity detection.

FIG. 1 shows an example embodiment of proximity based meeting invitations. A conference between participant devices 18, such as computers, occurs in a meeting region 12. A host device 14, such as a conference phone, is also a participant device or interacts with the meeting server 16 for managing the meeting. The meeting server 16 communicates data, audio, and/or video between participant devices 18. A meeting invitee with a mobile device 20 may enter the region 12. The invitee may be added to the meeting at the last moment, during a meeting, or just before the meeting starts. When the invitee walks in to a meeting room, hall, or other region 12, the proximity triggers addition of the invitee to the meeting or triggers an invitation. If the invitee is in a list of invitees, then the invitee gets a notification on his mobile or other device 20 and/or an invitation to join the meeting. For example, proximity may trigger a pop up dialog on the mobile device 20 of the invitee: "Do you want to join this meeting?" The invitee clicks "Yes" and joins the conference or meeting. The invitation is sent or resent in response to proximity of the user.

Bluetooth or other technology is used to detect the proximity of the user's device 20 near the conference room or other region 12. For example, a round table or other conference phone in the meeting room scans periodically for all Bluetooth enabled devices in the proximity. If a device is detected, the device is within the proximity and the phone scans the Bluetooth session directory to identify the invitee. If the invitee is in the list of invitees in the configuration for the meeting set up by the organizer, the phone sends a meeting invite or other information to the invitee over Bluetooth or any other wireless media. This information contains a token that refers to the particular invitee. If the invite accepts the meeting, an acknowledgment is sent back to the phone, which sends a complete URL and meeting information. Alternatively, the url and meeting information may be sent with or instead of the token. The invitee can use the information to connect to the meeting from his computer or mobile device. In another variation, the conferencing software on a user's personal computer launches using the meeting id and password in response to the user accepting the meeting invitation. The user's mobile device may use Bluetooth pairing or other communication with the user's computer to launch the meeting on the computer.

In one example, a user is included on a list of possible attendees for a training session in a particular room. To participate in the meeting, the user is to be present in the room. If the user enters the room with a mobile device, such as a radio frequency identification tag on a company identification badge or a mobile phone with Bluetooth capability, the presence of the mobile device in the room is detected. The mobile device, a host device (e.g., conference phone), or other system detects the proximity of the user to the meeting. By walking into the location of the meeting, the user is aided in and/or allowed to join the meeting automatically or with a simple acknowledgement. The user need not find a previously sent invitation and/or need not even do anything. For example, just having a mobile device turned on with a Bluetooth meeting service application running is enough. A general computer available in the room or the user's computer may be joined to the meeting based on the proximity of the user to the meeting. The user joins the meeting by being there at the venue. An original invite, another invite, or meeting information may be sent in response to presence.

The meeting invitation is automatically sent to an invitee, who is in the proximity of a meeting room. The proximity may reflect an intent to join the meeting. The invitation is sent if the invitee is in a list of invitees. A single click or activation acknowledges the intent from the invitee to join the meeting, avoiding manual invitation by the host or searching by the invitee.

Figure 2:
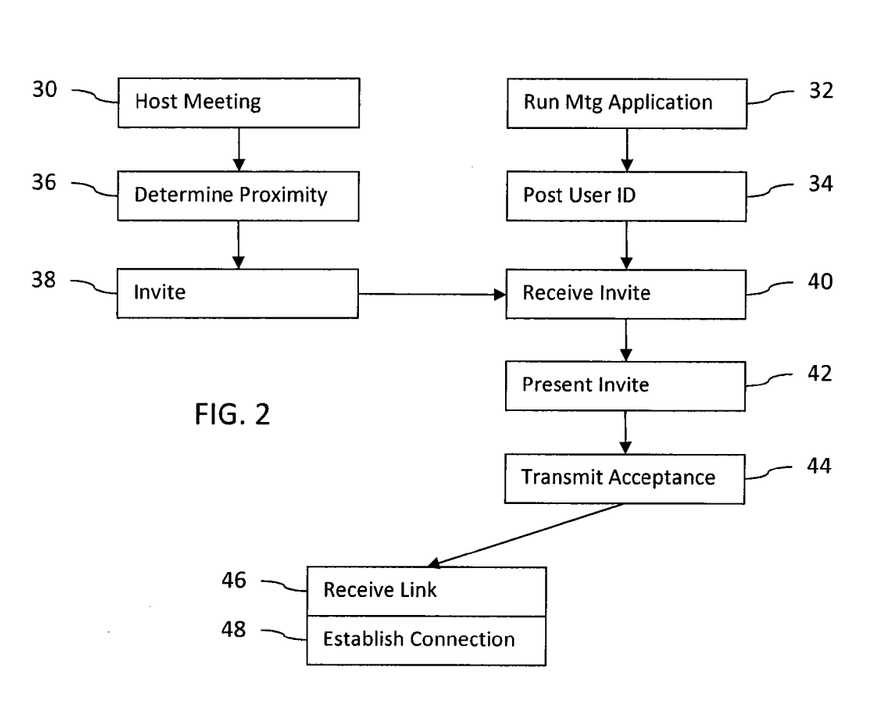
FIG. 2 illustrates one embodiment of a method for meeting participation using proximity detection.

FIG. 2 shows a method for inviting and/or joining a user to a meeting on a computer network. The method is used for the example embodiment of FIG. 1 or other embodiments, such as any meeting using a computer network.

Additional, different, or fewer acts may be provided. For example, the acts 30, 36, and 38 are provided by a host device or system without other acts. As another example, acts 32, 34, 40, 42, and/or 44 are provided by a mobile device or system associated with a mobile device without other acts. Acts 46 and 48 are provided for actual joining, but may not be provided where an invitation is sent based on proximity but the user elects not to join. Similarly, act 44 may not be provided except for actual joining. Acts 40 and 42 may not be provided where the connection to the meeting is provided automatically without user input.

In act 30, a meeting between participants is hosted in a computer network. The hosting interconnects computer network devices of the participants. In the training session example, different computers used by different participants are connected together in an intranet, over the Internet, via a wireless access point, in a local area network, over a wide area network, over a cellular network, combinations thereof, or other another network.

Communications information from one or more of the computer network devices are transmitted or routed to other computer network devices. For example, a presentation slide, audio, and/or video of a speaker at a conference are transmitted to computers or mobile devices in a conference room or conference center. Different computer network devices may provide the input for the conference at different times, such as associated with a participant asking a question. The audio, video, and/or text for the question is sent to the host device and routed to other participants.

Any computer network conferencing may be used, such as meeting applications from Webex Communications. On-demand collaboration, online meeting, web conferencing, or videoconferencing applications may be used, such as meeting, training, event, support, sales, computer assistance, office, or other network connection applications.

One or more meeting servers 16, with or without host devices 14, establish or maintain the meeting. For example, the meeting server 16 is a conference bridge, such as a video conferencing bridge or an audio conferencing bridge, either of which may be referred to as a multipoint conferencing unit (MCUs). The conference bridge may operate through either transcoding or switching. A transcoding conference bridge decodes the media stream from one or more endpoints and re-encodes a data stream for one or more endpoints. A switching conference bridge transmits the data, video and/or audio of selected endpoint(s) to the other endpoints based on the active speaker. In the case of more than one active speaker, plural endpoints would be selected by the switching video conference bridge. The meeting server 16 and host device 14 may be the same or different devices.

Any conference communications format may be used. For example, H.264-SVC and H.264-AVC video compression standards are used. H.264-AVC is formally known as ISO/IEC 14496-10—MPEG-4 Part 10, Advanced Video Coding, completed May 2003 available at http://www.itu.int. Scalable Video Coding (SVC or H.264-SVC) is an extension found at Appendix G of H.264-AVC, completed November 2008, also available at http://www.itu.int. The SVC extension enables the encoding of video streams that contain one or more subset video streams, which may be referred to as layers. The conference may include a mix of H.264-SVC and H.264-AVC endpoints.

A host or organizer of the meeting provides or enters settings for the meeting. One setting is a list of possible participants. The list may include required participants and non-required participants. For example, the organizer indicates required participation for one business group and allowed participation for another business group that may be interested in the meeting. Any business group, such as a specific project group or department may be invited. Alternatively, selected people are invited regardless of business group assignment.

The conferencing application or the organizer sends invitations to all of the possible participants. The invitations are sent prior to or even during the meeting. The invitations include the needed information for joining the meeting, such as a url link and password. Other information, such as a time and location and/or a calendar reservation, may be included. Alternatively or additionally, the meeting is published, such as being visible in calendars of the possible participants. Any mechanism for inviting or notifying possible participants of the meeting may be used.

The possible participants may accept at the time an invitation is received. An application causes the user's computer to automatically connect to the meeting at the time of the meeting. Alternatively, a possible participant may join a meeting at the time of the meeting. For example, a reminder is sent to the user or provided on the user's calendar. At the time of the meeting, the user selects a link and enters a password to join the meeting. One or more possible participants may fail to respond to the invitation or fail to join at the time of the meeting. For possible participants that do not respond or those that have responded but are not otherwise joined to the meeting when the meeting occurs, proximity to the meeting may be used to assist in joining.

In act 32, a device associated with a possible participant runs a meeting application. The device is a mobile device, such as a mobile phone or laptop, of the user. In one embodiment, the mobile device includes Bluetooth functionality (e.g., IEEE Standard 802.15.1-2002, IEEE Standard 802.15.1-2005, or over versions) or operates pursuant to other local wireless communications. Alternatively, the device is a computer with a WiFi communications link. In another alternative, an RFID tag of the user is the mobile device. A conference phone communicates with a computer of the user or a server with access to a database of employees and their respective RFID information. The conference phone or meeting server runs the meeting application instead of the mobile device.

The meeting application is part of the application for hosting or is a separate executable for proximity detection and communication regarding meetings. For example, a mobile device of the possible participant runs, based on user configuration, boot-up sequence, or user activation, a program for indicating that the possible participant is accepting of proximity-based meeting communications. The meeting application runs in the background until user interaction, if any, is triggered.

In one embodiment, the meeting application posts a flag to a Bluetooth service discovery protocol (SDP) directory. The SDP provides the flag for any inquiring devices. Alternatively, no separate flag is provided.

Alternatively, the device does not run a meeting application. Instead, published user identification information is used without a separate meeting executable on the mobile device of the possible participant. The possible participant is assumed to accept proximity-based meeting communications.

In act 34, user identification information is posted. For Bluetooth operation, the mobile device includes a user identification and/or a device media access control (MAC) address. The identification and address are provided as part of the SDP or otherwise provided. Since the SDP is visible or accessible to Bluetooth master device scanners, the user may be directly identified or identified by cross-referencing a database. The mobile device's Bluetooth SDP directory contains a mapping from device-id to user-id. This user-id mapping on the SDP is added by the client Bluetooth application (the meeting application) when the application is launched or may be available for other reasons. In other embodiments, just a device identification is posted or provided in response to an inquiry. The device identification may be used to look-up the user in a database or the hosting application may include a list of devices associated with possible participants. In other embodiments, other user identification information is provided. The information may be the user name or information used for cross-referencing the user.

The user identification is posted, such as being in a readable file. Alternatively, the user identification information is provided in reply to an inquiry. In other embodiments, the user identification information is broadcast, such as periodically transmitting the identification.

The user identification may be encrypted. Alternatively, the user identification may be an encryption key associated with a particular user. Both the meeting application (e.g., mobile device) and the host device (e.g., conference phone, bridge, or server) may use encryption for communication and/or to authenticate. For example, public-private key encryption/decryption techniques are used to authenticate. Alternatively, device certificates are used for authentication.

As one example of the use of proximity in network conferencing, a meeting is being hosted or is about to be hosted in act 30. For example, a training session or project meeting is to occur in a conference room. A possible participant has a mobile device with them. The possible participant and the mobile device enter the conference room. The mobile device runs a meeting application in act 32 that causes identification information to be available in act 34. If the possible participant with the mobile device enters the room, the intent of the possible participant to join the meeting may be inferred.

In act 36, the hosting device determines that the mobile device of a possible participant is proximate to the meeting. Where the host device is local to the meeting, the possible participant's proximity to the host device is determined.

The host device, access point, cellular system, or other sensor scans for the mobile communications device. For example, the host device includes a Bluetooth transceiver allowing proximity detection. As another example, a camera of the meeting room or computer is used for recognizing the possible participant. In another example, one or more WiFi access points communicate with the mobile communications device. Any type of scanning may be provided. The mobile device includes data for one or two-way communications, such as an RFID tag including output code or a mobile phone including the SDP information.

The scanning is used to determine position or distance. For Bluetooth implementation, the distance of the mobile device from the meeting or host device is determined. Signal strength may be used to estimate distance. Alternatively, the distance is a binary determination where the ability to communicate without a certain level of interference or a threshold signal strength is used to determine proximate or not. If the mobile communications device is within communications range, such as within range for Bluetooth communications, the mobile communications device is considered proximate. The communications range may be with the host device, devices of one-or more other participants, or other devices in the meeting region.

For location, the layout, size, and/or location of the meeting may be known. The location of the mobile device is detected, such as passing an RFID scanner or triangulation with multiple sensors (e.g., access points or cellular base stations). Local area position determination within a building may be used. For meetings outside a building, global positioning, cellular, or other position information may be used. The area, layout, or size of the meeting area is configured, predetermined, or assumed. If the mobile device is within the meeting area, then the mobile device is proximate to the meeting or meeting room. If the mobile device is outside the meeting area, then the mobile device is not proximate to the meeting. Proximity may include a range beyond a conference room, such as the user being in a conference center.

Any distance or range may be used for proximity. For Bluetooth, the effective communications range may be used. In one example, being within a meeting room is proximate and outside is not proximate. In another example, being within 10-30 feet of a point (e.g., host device) is proximate and outside the range is not proximate.

The device that is proximate is associated with a user identification to determine whether a possible participant is proximate to the meeting. Information from the mobile device provides user identification. For example, a Bluetooth capable device (e.g., the conference/RT phone or a meeting computer) scans the Bluetooth devices in proximity and accesses their SDP directories. The user-id and/or MAC address information is obtained. Other information may be obtained. The information directly represents the possible participant (e.g., "John Doe" or employee "1234" provided as the user-id) or may be used to cross reference to a user identification (e.g., the MAC address). The host device or a connected server cross-references the identification information with the user.

The user identification for the mobile communications device is compared with a list of invitees. An invite is sent only if the participant belongs to a list of invitees in the meeting host's list of invitees. The list of invitees may be for specific people or may be for specific groups (e.g., all employees in the project group or department). The host may configure the meeting to include or exclude different groups. The included groups may or may not have received a specific invitation prior to the meeting. For example, the meeting host selects between two access profile—public access or private access. For public access, anyone is authorized to join the meeting. For private access, only members of restricted groups may join the meeting or even be informed of the meeting.

Two or more levels of access may be provided, such as allowing a member of a broader group access only after acceptance in real-time by the host. A message is sent from the host device or other device to the meeting organizer. The message requests permission to assist the user in joining. For example, the message is used to communicate to the host that a particular user is proximate and may want to join (e.g., send a message to the host saying "John Doe has entered the meeting room. Should I send him the Webex meeting information?"). The meeting organizer still needs to take action, but the action is a simple button press. This assists the host but also prevents unauthorized people from getting access to the meeting. Based on the profile for the meeting, the host has a list of invitee user-ids to whom the meeting invite could be sent when the user is in proximity, a list of invitee user-ids to whom participation is possible with further authorization, and/or a list of invitee user-ids who are required to attend. Other lists are possible. Different lists are associated with the same or different levels of access.

Determining that a proximate user is included in the list of invitees may be sufficient to send an invite or launch a meeting. Using only proximity and list comparison may be appropriate where the mobile communications device is an RFID tag or does not have the meeting application running. In other embodiments, further processing may occur, such as communications between the mobile device and the host device or meeting server. In other embodiments, the comparison of the user identification to the invitee list is not performed. For public meetings, the process may continue without reference to the invitee list.

If the communications device is not associated with a possible participant or the communications device does not indicate participation in proximity-based meeting assistance, the process may cease. For example, the SDP may not have the meeting request flag turned on. Where the flag is off, the process ceases. Where a user is not on the list of invitees for a private meeting, the process ceases. If the flag is on and the user is on the invitee list, then the process continues.

In act 38, an invite is sent to the proximate, possible participant. The host device, a connected server, or other device sends the invite to the communications device of the user. For example, a conference phones sends the secure meeting invitation using Bluetooth by push notification over a Bluetooth socket to the mobile device of the user. The meeting invite is sent to a possible participant of the meeting where that participant walks or moves into a conference or meeting region. If the user identifications associated with the mobile device is in the list of public or private profile participants, a meeting request link is sent to the Bluetooth enabled device. If the user is not proximate, the invite is not sent.

The invite may be sent to another device of the user, such as a computer being carried by the user or not with the user. The invite may be sent to a server, such as an IM or email server rather than the communications device. In another embodiment, using the room's calendar to know the meeting identification information, searching for local meetings from a database, or other cross-reference, a possible participant may be joined to the meeting by an application in the mobile device without scanning by the host device. Alternatively or additionally, the host device or meeting moderator may publish, broadcast, or otherwise push the meeting identification as part of their presence to everyone who is potentially invited.

The invite is an actual invite, such as the invite sent to announce the meeting. For example, the invite includes a meeting url link, a meeting-id, and/or password so the possible participant can join the meeting or share. For sharing, a conferencing application allows the host and the meeting participants to share their desktop screen or application window for other participants to view. Initially, the meeting host user has the control of the shared space showing his/her desktop or application window. The meeting host may also transfer this control to any other valid participants in the meeting.

A network link for the meeting is sent to the communications device. The same invitation as was previously sent to the user, a standard invitation, or an invitation specific to proximity-based meeting assistance is provided. The invitation may be sent via email or instant messaging to the device. Alternatively, the Bluetooth format is used to trigger the meeting application for more rapid communication with the user.

Alternatively or additionally, the invite triggers output to the user letting them know of the proximate meeting and requesting whether they want to join. For example, an authentication token referring to a session identification of the meeting and encrypted for the possible participant is sent. For security, only the mobile device or other device associated with the possible participant may decrypt the token. The token is used to join the meeting.

In other embodiments, the invite causes the possible participant to be automatically joined to the meeting. For example, a meeting launcher application running on a possible participant's laptop or mobile device monitors the device's current location and then attempts to log the person into the meeting scheduled for that room.

Other processing may be provided. For example, the number of training computers or meeting participants may be fewer than the number of possible participants. Before the invite is sent, the current availability of space is checked. Given the current participants, and/or expected participants (e.g., participants previously indicating plans to join the meeting), the number of available locations is determined. If there are available locations, the invite is sent. As another example, an invite may be sent to one possible participant and not another at a given time. The host in real-time or a device based on meeting lists of invitees selects between possible participants. If there are multiple people in the room but not joined, only those on a priority list (e.g., part of the group to receive training) are invited, at least at first. After sufficient chance to respond, invites may be sent to a broader category of possible participants (e.g., part of another group).

In act 40, the invite information is received for a meeting based on proximity of a device to the meeting. The invite information may be encrypted or otherwise secured, such as using a key based on the user identification.

The information is received by the mobile device or another device. An email server, instant messaging server, computer or other device with the possible participant or spaced from the possible participant receives the invite information. For example, the invitation is emailed to the user. The user accesses the email to receive the invite information locally. The invite information may be received at a non-local location. The device receiving the invite information is associated with the user identification.

In one embodiment, the mobile computing device (e.g., mobile phone, tablet, or laptop computer) running the meeting application receives the invite information. The computer readable storage media used for the meeting application is in the mobile computing device. The invite information is received while the meeting application is running. The meeting application processes the invite information.

One example use of the invite information is provided in act 42. The meeting application presents an opportunity to join the meeting to the user of the mobile device. The opportunity is based on the invite information, such as displaying a meeting subject, time, and/or location. The meeting information is provided in the invite or remotely accessed using the meeting identification. In one example, a selection option for joining the meeting is presented to the user. The client Bluetooth enabled invitee device (mobile device) generates a pop up, such as a "JOIN MEETING" button. The pop up may be associated with an audio signal or vibration to alert the user to the option. Other outputs may be used. Alternatively, the invitation is presented to the user as a calendar option, email, instant message or other format.

The user activates or selects the meeting to indicate a desire to join the meeting. By just clicking once, the invitee may join the meeting. Additional actions may be required. In other embodiments, the meeting information is presented to the user and the user is automatically joined to the meeting without actively accepting the option. No user selection or activation at the time of receiving the invite information is needed.

In act 44, the acceptance of the opportunity is transmitted. The acceptance is the manual clicking or selection of the meeting, such as activation by the possible participant of the output on the mobile device. Alternatively, the acceptance may be an acknowledgement from the mobile device without further user interaction.

The transmission is to the host device. Using Bluetooth communications, the mobile device communicates acceptance of the invitation. Other communication may be used. For example, acceptance may be transmitted via a wireless computer network (e.g., WiFi) or cellular network. The acceptance may be for linking to the meeting, such as associated with navigating to the meeting url. Where the acceptance is not linking to the meeting, the acceptance may indicate that a link should be established. For example, the acceptance causes the conference bridge, host device, or other server to activate the meeting on a workstation, computer or other device to which the participant is to be assigned. The assignment may be communicated to the user via the mobile device, notification to the host, email, instant message, text, or other mechanism. In other embodiments, acceptance is not transmitted, but is assumed.

In act 46, a network link is received in response to the transmitting of the acceptance. The network link is for joining the meeting. The link is received by the mobile device or another device. The link may have been previously received as part of the invite information or is not provided until after acceptance in act 44.

In act 48, a connection to the meeting is established. The connection is established based on the invitation and/or acceptance. Where the possible participant has the opportunity to not join the meeting, the connection is established once the acceptance is received by the host device, conference bridge, or other server. Where the joining is automatic based on proximity, then the connection is established by receiving the identification of the possible participant.

The connection is established by launching conferencing software. The launching may be through a computer network, such as joining using the meeting url, meeting identification, and password.

The launching may be through a cellular or other network, such as launching the meeting on a mobile phone. For example, the user accepts the invitation presented by the meeting application on a mobile device. In response, from the user's perspective, the meeting in launched on the mobile device. Conferencing software included on the mobile device or the meeting application connects to the conference bridge using the meeting identification and password provided in the invitation and begins receiving video, audio or other meeting data.

In another embodiment, the connection to the meeting is established on another device. For example, the proximity determination is made in communication with a mobile phone or RFID tag. Once the connection to the meeting is to be made, a computer of or for the user is connected to the meeting rather than the mobile device. The proximity detectable wireless device, once getting the meeting invite, launches the meeting automatically in the invitee's computer. The meeting url, meeting number, password are supplied to the computer to enable join the meeting.

Acts 46 and 48 occur on the mobile device or a different device. For example, the meeting is established or launched on a computer in the conference room, but not the mobile device used to determine proximity. The link may be sent to the computer, so that the meeting is established based on the link.

Figure 3:
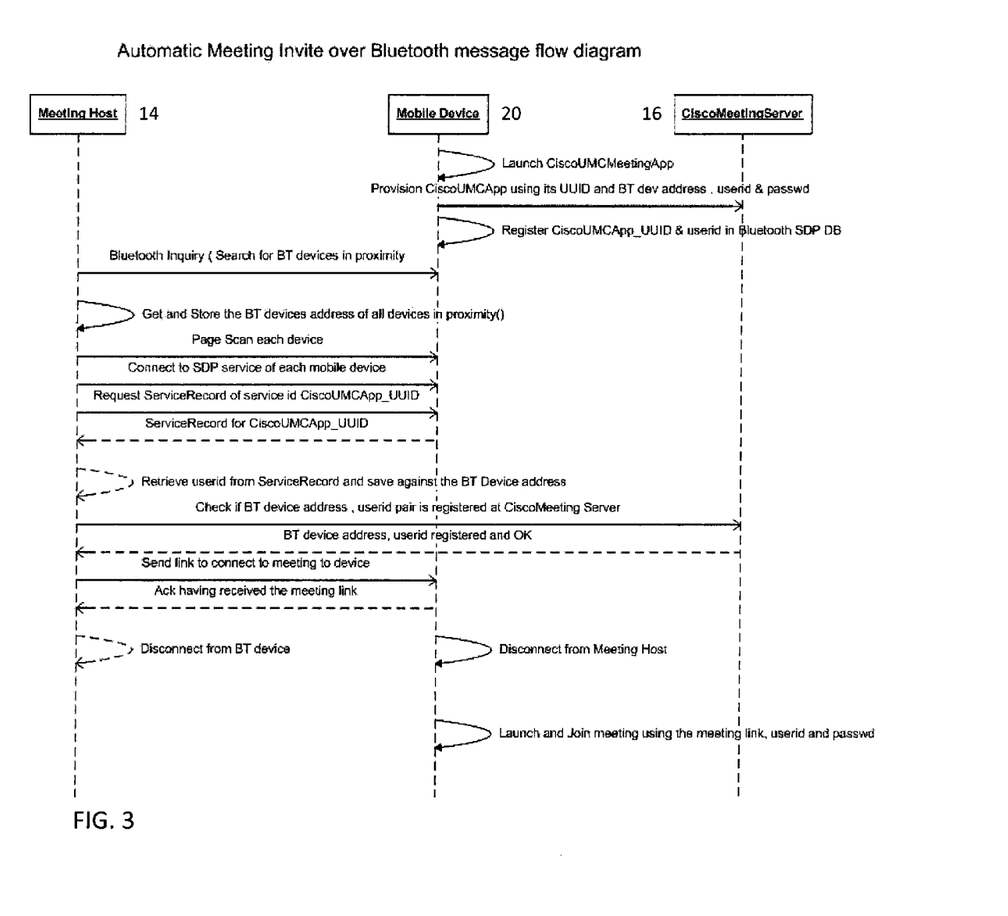
FIG. 3 illustrates another embodiment of a method for meeting participation using proximity detection.

FIG. 3 shows one embodiment of the method of FIG. 2. The MeetingApp is run on the mobile device where the UUID is the device identification of the mobile device and BT is the Bluetooth SDP information. The meeting server is the conferencing bridge or other server handling meetings. The meeting server and the meeting host may be the same device or network.

The mobile device and associated identification information is registered with the meeting server. For example, the registration occurs once when the meeting application is loaded onto the mobile device. Alternatively, the registration occurs whenever the meeting application is configured or re-executed.

The meeting server also includes the invitee list or list of people authorized to join a given meeting. For example, the meeting coordinator configures a given meeting by indicating a list of invitees.

The meeting host is a conference phone or other device or system for determining proximity of the mobile device using Bluetooth. The meeting host searches for Bluetooth devices in range. Signal strength thresholds, ability to communicate or other criteria are used to determine proximity. The meeting host scans each proximate mobile device. For example, bluetooth allows master devices to peep the SDP of client slave devices without actually making a connection to the complete device. This mode is quicker and happens at the lower network link layer. Information from the SDP is quickly read by the Master. Alternatively, a connection is made to the device for application coded two way socket communication. The meeting host views (e.g., scan or two-way communication) the SDP of each mobile device, and requests or reads the identification information and flag information. After the identification information is retrieved and registered to the mobile device, the meeting host cross-references the identification information and/or the Bluetooth device address with the list of mobile devices registered with the meeting server. If the meeting server acknowledges that the user of the mobile device is allowed to join the meeting, the meeting information is sent to the mobile device with a link. The mobile device acknowledges receiving the meeting information. After receiving the acknowledgement, the meeting host disconnects the Bluetooth session from the mobile device, and the mobile device disconnects the Bluetooth session from the host device. The meeting is launched and joined.

Figure 4:
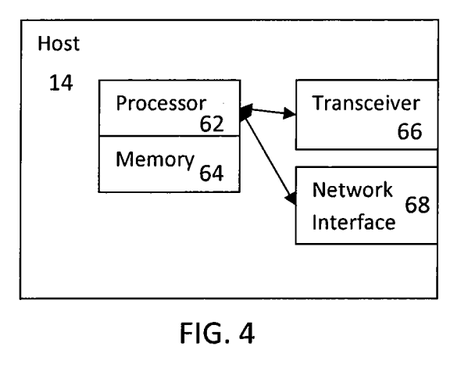
FIG. 4 illustrates a block diagram of the host device of FIG. 1.
Figure 5:
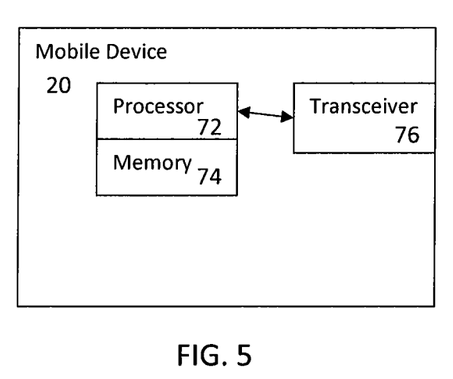
FIG. 5 illustrates a block diagram of the mobile device of FIG. 1.

FIG. 4 shows a host device 14. FIG. 5 shows a mobile device 20. A conference or meeting server 16 may be similar to the host device, but with or without the transceiver 66. All three, only two, or just one of these meeting devices operate in the proximity-based meeting system. In one embodiment, these meeting devices are part of Webex or any other enterprise conferencing product. The meeting host software in the meeting host device 14 or the meeting server 16 may be enhanced to automatically scan for invitees with Bluetooth or any wireless enabled device that would allow proximity detection. The mobile device 20 is a smart-phone, notebook, tablet, or other device with or without a conferencing application (e.g., the meeting application). The meeting application allows identification information to be discovered by the host phone containing the host scanning software for detecting invitees in proximity.

The meeting server 16 is a video, audio, or other conference bridge, such as a multipoint control unit or a multipoint conferencing unit (MCU). Other servers may be used. The meeting connected participant devices 18 are video, audio, or other conferencing devices (e.g. personal computer). The media conference is conducted by the meeting server 16. The meeting server 16 connects between participant devices at endpoints via a communication network. The communication network may include a public switched telephone network (PSTN), the Internet, a local area network (LAN), a wide area network (WAN), a wired network, a wireless network, a cellular network, a combination thereof, or any other network suitable for carrying media. The communication network may include one or more intermediary components, such as gateways, routers, switches, hubs, or other component.

In one embodiment, the host device 14 (e.g., conference phone) is an intermediary device. The host device 14 connects through the network or a different network to the participant devices 18. In other embodiments, the host device 14 arranges for invites, but is not part of the conferencing network (i.e., is not an intermediary device). The host device 14 may be an endpoint for the conference server 16, such as an audio and/or video device (e.g., conference phone or computer) for accepting input from and providing output to a group of people.

The host device 14 includes a processor 62, memory 64, transceiver 66, and a network interface 68. Additional, different or fewer components may be provided. For example, the host device 14 uses the transceiver for connecting to participant devices 18 and/or the conference server 16, so does not include the network interface 68 (or vice versa).

The mobile device 20 includes a processor 72, a memory 74, and a transceiver 76. Additional, different, or fewer components may be provided. For example, the mobile device 20 also includes a network interface or has a network interface instead of the transceiver 76.

The participant devices 18 include processors, memories, network interfaces, transceivers, and/or other components. The participant devices are any now known or later developed device allowing a participant to receive and/or transmit video, audio, and/or data as part of a conference. For example, the participant devices 18 are other mobile devices, computers, internet protocol (IP) phones, a video phone, a dedicated video conferencing systems or other device allowing participation in a conference. The participant devices 18 are within the conference room 12 or other meeting area, but one or more participant devices 18 may be located in other areas, such as remote locations, outside of the conference room 12. The meeting may be held in multiple locations, such that proximity to any of the locations is used.

The processors for the different devices are the same or different. The processors (e.g., processors 62, 72) are general processor, digital signal processor, application specific integrated circuit, field programmable gate array, analog circuit, digital circuit, server processor, combinations thereof, or other now known or later developed processor. The processors may be a single device or combinations of devices, such as associated with a network or distributed processing. Any of various processing strategies may be used, such as multi-processing, multi-tasking, parallel processing, remote processing, centralized processing or the like. The processors may be responsive to or operable to execute instructions stored as part of software, hardware, integrated circuits, firmware, micro-code or the like. The functions, acts, methods or tasks illustrated in the figures or described herein may be performed by the processor executing instructions stored in the memory. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The processor 62 of the host device 14, such as a conferencing phone, includes an application for proximity detection and/or communicating information for proximity detection. For example, the processor 62 connects with the transceiver 66. The processor 62 uses signals from the transceiver 66 to detect information about proximity of the mobile device, to calculate the proximity, and/or to communicate with the mobile device 20, such as to send invite information and receive acknowledgement. The processor 62 may also identify the user of the mobile device 20, cross-reference the user with an invitee list, determine whether to send invite information and what invite information to send, send meeting or link information, determine a participant device to use for a proximate possible participant, determine what type of communication (e.g., via the transceiver 66 or an email server), make authorization decisions, and/or make other determinations related to establishing a meeting connection based on proximity. The meeting server 16 or other devices may perform some or all of the actions.

In one embodiment, the processor 62 detects a user's device within a distance of a location of a meeting. The meeting location is a room or other area in which communications occur, at least in part, over a network between a plurality of participants. The processor 62 is configured by the application to detect the user's device being within room or meeting location. The detection is direct, such as measuring signals from the device, or indirect, such as receiving position or distance information from the device or other sensor. A user identification is received from the user's device for determining authorization of the user to participate in the meeting.

The processor 72 of the mobile device 20 includes an application for receiving invite information based on proximity and/or communicating information for proximity detection. For example, the processor 72 connects with the transceiver 76. The processor 72 posts or responds to requests for identification information. The processor 72 may make measurements for proximity detection and report the measurements or calculated proximity information to the host device 14 or the meeting server 16. The processor 72 performs other actions of the meeting application, such as setting a flag, generating a request for input from the user to accept an invitation or join a meeting, and/or launch a meeting connection. Using the transceiver 76, the processor 72 communicates with the host device 14, such as to receive invite information and send acknowledgement.

The transceivers for the different devices are the same or different. The transceivers (e.g., transceivers 66, 76) each include a transmitter and a receiver. In other embodiments, only a receiver is provided where the mobile device regularly transmits user information. Any now known or later developed transceiver may be used, such as a Bluetooth or WiFi transceiver, for communicating wirelessly with the mobile device 20. The transceiver 66 communicates with the transceivers 76 of any mobile devices 20 in range of the signals. The processor 62 uses the transceiver 66 to send invite information, to send a network link for the meeting, and receive any user information and acceptance for the meeting. The processor 72 uses the transceiver 76 to send identification information, to receive invite information, and/or to transmit invite acceptance information. The transceivers 66, 76 are configured by software or hardware for communicating information between the processor 62 and the processor 72.

The network interface 68 is an Ethernet card or other device for communicating over a computer network. The network interface 68 may include an input communication interface and an output communication interface. The network interface 68 is configured to establish connectivity with the meeting server 16, the participant devices 18, or other network devices. The network interface(s) 68 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, the network interface 68 may include a first communication interface devoted to sending data, packets, or datagrams and a second communication interface devoted to receiving data, packets, or datagrams. Alternatively, the network interface 68 may be implemented using a single communication interface.

The communication links may be any protocol or physical connection that is used to couple a server to a computer. The communication paths may utilize Ethernet, wireless, transmission control protocol (TCP), internet protocol (IP), or multiprotocol label switching (MPLS) technologies. As used herein, the phrases "in communication" and "coupled" are defined to mean directly connected to or indirectly connected through one or more intermediate components. Such intermediate components may include both hardware and software based components.

The memories for the different devices are the same or different. The memories (e.g., memories 64, 74) are each one or more computer readable storage media encoded with software comprising computer executable instructions. The software configures the processors for execution. The memories may be any known type of volatile memory or a non-volatile memory. The memories may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory.

The memories may store computer executable instructions for the algorithms discussed herein. The processors may execute the computer executable instructions. The computer executable instructions may be included in computer code. The computer code may be stored in the memories. The computer code may be written in any computer language, such as C, C++, C#, Java, Pascal, Visual Basic, Perl, HyperText Markup Language (HTML), JavaScript, assembly language, extensible markup language (XML) and any combination thereof. The computer code is encoded in one or more tangible media or one or more non-transitory tangible media for execution by the processors.

The instructions may be stored on any computer readable medium. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:

hosting, with at least one processor of a host device, a meeting at a predetermined physical meeting location between participants in a computer network;

scanning with a transceiver of the host device for communications devices in proximity of the physical meeting location;

receiving, with the at least one processor from the transceiver of the host device, an identification message from a particular communications device associated with a possible participant of the meeting; in response to receiving the identification message from the transceiver, determining, with the at least one processor, whether the particular communications device is proximate to the predetermined physical meeting location for the meeting; and sending, with the at least one processor, an invite for the transceiver to send to the particular communications device, the invite being a request for the possible participant to join the meeting, the sending being in response to determining that the particular communications device is proximate the host device at the predetermined physical meeting location, wherein sending the invite comprises sending a token referring to a session identification of the meeting and encrypted for the possible participant.

2. The method of claim 1 wherein hosting comprises interconnecting, with the at least one processor, computer network devices of the participants,
receiving, with the at least one processor, communications information from one of the computer network devices, and
transmitting, with the at least one processor, the communications information to others of the computer network devices.

3. The method of claim 1 wherein determining comprises determining, with the at least one processor, that the communications device is within communications range.

4. The method of claim 1 wherein determining comprises determining, with the at least one processor, that the particular communications device is within a room.

5. The method of claim 1 wherein determining comprises determining, with the at least one processor, that the particular communications device is within a distance from the host device, the host device comprising a conferencing phone.

6. The method of claim 1 further comprising comparing, with the at least one processor, a user identification for the particular communications device with a list of invitees.

7. The method of claim 1 further comprising establishing, with the at least one processor, a connection for the possible participant to the meeting based on the inviting.

8. The method of claim 1, wherein the invite comprises a subsequent invite, the method further comprises:
sending, with the at least one processor, an initial invite to the particular communications device before occurrence of the meeting; and
detecting, with the at least one processor, a failure of the possible participant to respond to the initial invite or to join the meeting in response to the initial invite,
wherein sending the subsequent invite comprises sending, with the at least one processor, the subsequent invite to the particular communications device in response to detecting the failure of the possible participant and determining that the particular communications device is proximate the host device at the predetermined physical meeting location.

9. The method of claim 7 where establishing comprises launching, with the at least one processor, conferencing software on the particular communications device in response to user acceptance of the invite.

10. A meeting system comprising:
a communications device of a user; and
a host device comprising:
a transmitter; and
a processor connected to the transmitter, the processor configured to:
host a meeting at a predetermined physical meeting location between participants in a computer network;
scan for communications devices in proximity of the physical meeting location and detect whether the communications device of the user is proximate to the predetermined physical meeting location of the meeting;
when the communications device of the user is proximate to the predetermined physical location, generate an invite to request that the user join the meeting, wherein the invite is generated to include a link that allows the communications device to join the meeting and a token referring to a session identification of the meeting and encrypted for the user;
send the invite to the transmitter; and
wherein the transmitter is configured to send the invite to the device upon receipt of the invite from the processor.

11. The meeting system of claim 10 wherein the processor comprises a conferencing phone.

12. The meeting system of claim 10 wherein the transmitter comprises a Bluetooth transmitter.

13. The meeting system of claim 10 wherein the processor is configured to detect the communications device being within a room.

14. The meeting system of claim 10 wherein the host device further comprises a receiver, connected with the processor, the receiver configured to receive an acceptance of the invite from the communications device.

15. The meeting system of claim 10 wherein the processor is further configured to:
receive a user identification from the communications device:
identify that the user identification is included in a list of invitees for the meeting; and
generate the invite further in response to the identification that the user identification
is included in the list of invitees.

16. The meeting system of claim 10, wherein the invite comprises a subsequent invite, wherein the processor is further configured to detect a failure of the user to respond to a prior invite of the meeting or join the meeting in response to the prior invite, and
wherein the transmitter is configured to transmit the subsequent invite to the communications device in response to the detection of the failure of the user and the detection of the communications device proximate to the predetermined physical meeting location of the meeting.

17. One or more non-transitory computer readable storage media encoded with software comprising computer executable instructions operable to:
receive a search inquiry from a transceiver in a mobile device, the search inquiry originating from a host device searching for communications devices in proximity to a predetermined physical meeting location of a meeting;
send a device address of the mobile device to a transceiver of the mobile device for a transmission to a host device;
responsive to receiving a request for a user identification associated with a possible participant for the meeting, posting the user identification to the transceiver of the mobile device for transmission to the host device to determine whether to possible participant is proximate to the predetermined physical meeting location of the meeting;
receive invite information for the meeting in response to a determination by the host device that the possible participant is proximate to the predetermined physical meeting location of the meeting, the invite information including a token referring to a session identification of the meeting and encrypted for a user of the mobile device; and
present to the user of the mobile device an opportunity to join the meeting, the opportunity being based on the invite information.

18. The one or more computer readable storage media of claim 17 wherein the invite information being received is based on the user identification.

19. The one or more computer readable storage media of claim 17 wherein the mobile device comprises a mobile computing device housing the computer readable storage media, and wherein the presentation comprises output of a selection to activate joining the meeting;
further comprising software comprising executable instructions operable to:
transmit acceptance of the opportunity; and
receive a network link in response to the transmission of the acceptance.

20. The one or more computer readable storage of claim 17 further comprising: software comprising executable instructions operable to run a meeting application on the mobile device, wherein the receipt occurs during the run of the meeting application.

21. The one or more computer readable storage media of claim 17, wherein the invite information comprises subsequent invite information, the computer executable instructions operable to receive the subsequent invite information for the meeting in response to a failure of a user of the mobile device to respond to a prior invite or join the meeting and in response to the determination that the mobile device is proximate the predetermined physical meeting location.

* * * * *